Feb. 5, 1963  D. E. STEVENSON  3,076,649
DELIVERY SYSTEM FOR FLAT OBJECTS
Filed July 22, 1960
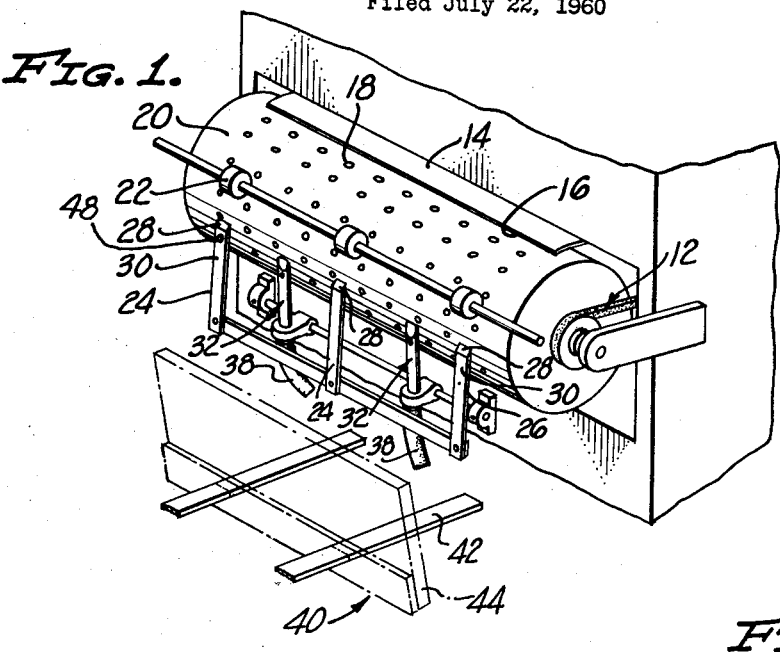
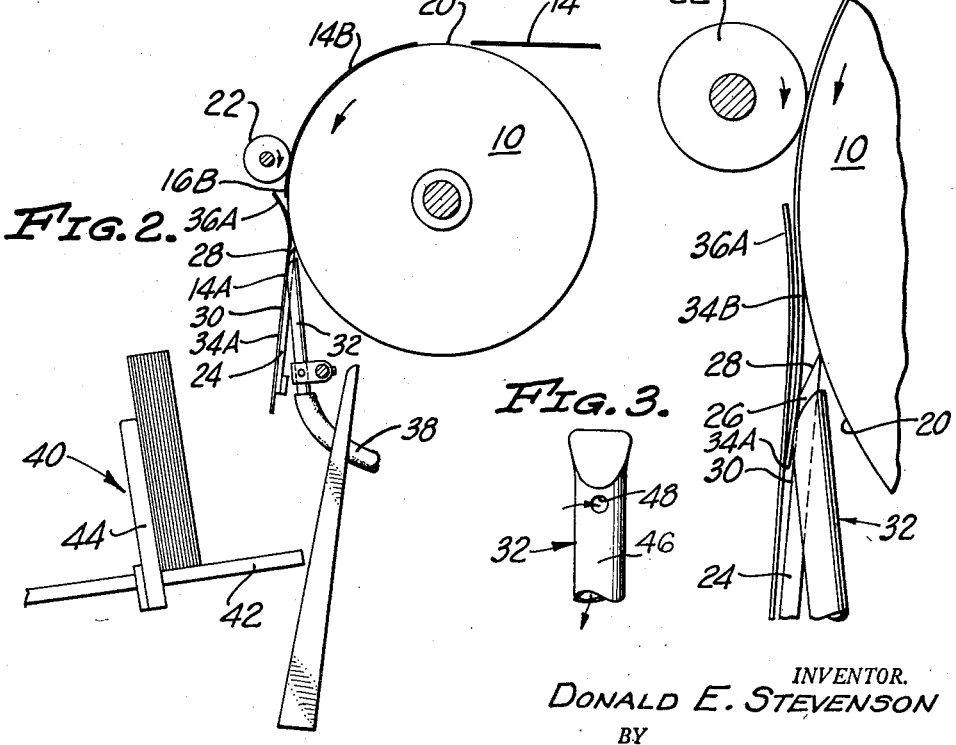
INVENTOR.
DONALD E. STEVENSON
BY
ATTORNEY

United States Patent Office 3,076,649
Patented Feb. 5, 1963

3,076,649
DELIVERY SYSTEM FOR FLAT OBJECTS
Donald E. Stevenson, P.O. Box 243, Anza, Calif.
Filed July 22, 1960, Ser. No. 44,750
6 Claims. (Cl. 271—71)

This invention relates to the transfer of pieces of paper, envelopes, and related flat objects in processing operations, and to their removal from equipment used in such processing.

There are many operations, such as printing and duplicating systems, envelope-forming systems and a great variety of systems for processing sheet-like pieces of plastic, metal or other substances, in which it is necessary to maintain a relatively high-speed continuous flow of large numbers of such sheet-like objects through the equipment used to perform such operations. Very often the "working" step in such operations, such as printing a legend on a sheet, folding an envelope, etc., can be performed at a relatively great speed, and the limiting factor on the speed of the complete operation is not the "working" step but rather the speed at which the flat or sheet-like objects can be brought to or removed from a "working" step in the complete operation. In particular, in many "printing" operations, including conventional printing, addressing, stamping, duplicating, check-cancelling, etc., a primary limiting factor for the speed with which the complete operation can be performed, is the maximum speed with which the sheet-like objects can be removed or delivered from the locus of the last "working" step. A conventional method of removal or delivery is to use a rotary cylinder, often provided with small apertures in its surface through which a vacuum is drawn, which rotates at a relatively high speed. This cylinder receives the leafing edge of one of the sheet-like objects along its surface, and moves the object along in close contact with the surface of the cylinder in the direction of the cylinder's rotation. The sheet-like object is often maintained in close contact with the surface of the cylinder by means of adjacent cylinders or freely-moving rollers which force the sheet-like objects against the surface of the rotating cylinder. The objects are conventionally removed from the cylinder, at a later point in the cylinder's rotation, by means of "stripper" rails or equivalent devices which peel the sheet-like objects from the surface of the cylinder. These "stripper" rails or equivalent devices comprise members, with one end relatively very closely adjacent to the surface of the rotary cylinder, which extend from the rotary cylinder at an angle slightly greater than tangency with the rotary cylinder. In high speed operations, the end of the "stripper" rails adjacent the surface of the rotary cylinder intervenes between the leading edge of the sheet-like object and the surface of the cylinder, thereby "peeling" the object from the cylinder. This step rarely if ever is a limiting factor on the speed at which the complete operation can be performed. It is at the next stage in the progress of the sheet-like object that difficulty has been encountered in conventional practice. The collection, and temporary or permanent removal from the complete system of operations, of the sheet-like objects is usually accomplished by means of a receiving structure, located beneath the "stripper" rails or equivalent device, which includes "delivery" rails or equivalent surfaces which abruptly stop the movement of the sheet-like objects. Such stopping of the motion of the objects is necessary because, in high speed operation, if the leading edge of the sheet-like object bends even a slight degree out of the plane of the object's movement, the whole object will curl and/or flutter or slide out of position. It has been found in practice, however, that abruptly slowing or stopping the movement of such sheet-like objects by means of "delivery" rails or equivalent structures against which the leading edges of the objects strike, limits the speed of the complete operation; since if the objects strike the delivery rails or equivalent structures at too great a speed they will crumple, crease, bend out of position, or otherwise be mutilated or interfere with the orderly working of the complete operation. The unsatisfactory nature of such results in high-volume, high-speed operations arises not only from the mutilation of the objects being worked on, but, more importantly, from the limitation imposed thereby on the speed of operations and from the time lost from operations by the necessity for slowing or stopping operations to remove objects which have crumpled or otherwise moved out of position so as to interfere with the delivery of further such sheet-like objects. The need has therefore been for a simple, inexpensive and effective method and means for avoiding such results without extensive alteration or replacement of existing equipment.

It is an object of the present invention to meet this need. A further object of the present invention is to provide a method of slowing or stopping the motion of sheet-like objects leaving the surface of a rotating cylinder. A still further object of the present invention is to provide a means for slowing or stopping such motion without having the leading edges of such objects strike an obstructing surface. It is another object of the present invention to provide vacuum-actuated means for sequentially removing sheet-like objects from a high-speed rotating cylinder and thereafter releasing and/or stacking such objects in a precise, orderly manner. Other objects and advantages of the invention will appear more fully from the remainder of this description, including the appended claims and the accompanying drawings, in which:

FIG. 1 is a perspective view of a delivery system in accordance with this invention;

FIG. 2 is a cross-sectional view of a delivery system in accordance with this invention;

FIG. 3 is a perspective view of a stripper rail formed in accordance with this invention; and FIG. 4 is a cross-sectional view of a portion of the systems illustrated in FIGS. 1 and 2.

In all figures of the drawings like numerals are used to designate like parts where convenient for purposes of illustration and explanation. The accompanying drawings are not to be taken as limiting this invention; those skilled in the art to which this invention pertains will realize that these drawings are intended to illustrate the nature of the invention and to designate clearly a preferred embodiment of this invention. Obviously the dimensions and relative sizes of the various parts of the constructions shown can be changed to adapt the invention for different uses and conditions.

As an aid to understanding the invention it may be stated in summary form that it concerns continuous delivery systems for a succession of flat or sheet-like objects wherein these objects are carried along the outer surface of a rotating cylinder and are removed therefrom by stripper means which intervene between the leading edges of the objects and the surface of the cylinder, in which the motion of a first such object along the surface of said stripper means after the major leading portion of said first object leaves the surface of the rotating cylinder is substantially stopped by application of a vacuum to the flat side of said object adjacent said stripper means which forces said first object against the surface of said stripper means, thereby holding said first object so that the trailing minor rear portion of said first object is bent away from contact with the surface of said cylinder, so that the leading edge of a succeeding second such object will intervene between the first said object and the surfaces of said cylinder and said stripping means, and in which the momentum imparted said second object by said rotating cylinder will carry said second object along the surface of said stripper means between said stripper means and said first object so as to release said first object from the vacuum holding said first object against said stripper means and so as to hold second object against said stripper means by the application of vacuum to the flat side of said second object in substantially the same position as said first object was held; all so that a succession of said flat objects may be continuously delivered at high speed. The invention is further summarized in the appended claims.

FIG. 1 shows a conventional rotatable cylinder 10, operatively connected to drive means 12 of the kind conventionally used in systems for processing flat objects 14, such as sheets of paper, plastic, metal, and other materials, and flat or sheet-like objects such as envelopes formed of such materials. In operation, the rotating cylinder 10 receives the leading edges 16 of such flat objects 14, as they leave some earlier step in the complete processing operation. Gripping means, exemplified by the apertures 18 formed in the surface 20 of the rotatable cylinder 10 through which a vacuum may be drawn, hold the flat objects 14 closely adjacent the surface 20 of the rotating cylinder 10. The gripping means, which in older relatively low-speed conventional systems may be mechanical structural means, are supplemented by cylinder or freely-moving roller means 22 mounted closely adjacent the surface 20 of the rotatable cylinder 10; in some systems such adjacent cylinders or rollers may form the only gripping means. The effect of the rotatable cylinder 10, the gripping means such as apertuers 18, and the roller means 22, in operation, is to carry flat objects 14 closely adjacent the surface 20 of the cylinder 10. In high-speed operations, such as conventional printing systems delivering 37,500 objects per hour, or in newer systems handling up to 100,000 objects per hour, this of course imparts a very high speed, and correspondingly great momentum, to the flat objects 14 carried on the surface 20 of the rotatable cylinder 10.

The flat objects 14 carried on the rotating cylinder 10 are conventionally removed therefrom by stripper means 24. These stripper means 24 conventionally comprise metal plates or prongs 26, the operative ends 28 of which are closely adjacent the surface 20 of the rotating cylinder 10, so as to be capable of intervening between the leading edges 16 of flat objects 14 carried on the cylinder 10 and the surface 20 of the rotating cylinder 10. These prongs 26 have "working" surfaces 30 capable of carrying the flat objects 14. The working surface 30 of the stripper means 24 extends away from the surface 20 of the rotating cylinder 10 at an angle greater than tangency thereto (i.e., the working surface 30 of the stripper means 24, if extended, would intersect the cylinder 10).

In operation, as the leading edge 16 of a flat object 14 carried by the rotating cylinder 10 passes the operative end 28 of the stripper means 24, which intervenes between said leading edge 16 and the surface 20 of the rotating cylinder 10, it is forced away from the surface 20 of the rotating cylinder 10. The continued rotation of the cylinder 10, and, particularly in high-speed operations, the momentum imparted the flat object 14 by the rotation of the cylinder 10, strips or "peels" the entire flat object 14 from the surface 20 of the rotating cylinder 10, and carries the flat object 14 along adjacent the working surface 30 of the stripper means 24 at a relatively high speed. Stripper means 24 are preferably located slightly below the horizontal plane through the center of the cylinder 10 and positioned, with regard to the direction of rotation of the cylinder 10, as shown in FIGS. 1 and 2, so as to extend downwardly away from the surface 20 of the rotating cylinder 10; however, stripper means 24 may, if desired, adjoin the surface 20 of rotatable cylinder 10 at any point, and may extend away therefrom horizontally or upwardly.

According to the present invention, vacuum means 32, which may be capable of either continuous or intermittent operation, are positioned adjacent stripper means 24 so as to be between said stripper means 24 and the rotating cylinder 10. In operation, the vacuum means 32 are operated so as to apply a vacuum to the leading major portion 34A of a flat object 14 as it is removed from the surface 20 of the rotating cylinder 10 as hereinabove described. The effect of this application of vacuum is to achieve a high-speed "braking" action without a violent impact, by forcing the major forward portion 34A of the flat object 14 against the working surface 30 of the stripper means 24, thereby slowing the motion of the flat object 14 and substantially stopping it in the position shown in FIG. 2 of the drawings. In this position the minor rear, or trailing, portion 36A of the flat object 14 is bent away from contact with the surface 20 of the rotating cylinder 10. Whether this slight bending-away from contact with the surface 20 of the rotating cylinder 10 is caused entirely by the angle at which the operative end 28 of the stripper means 24 adjoins the surface 20 of the rotating cylinder 10, or by the sudden slowing of the forward motion of the flat object 14, or by air currents generated by rotation of the cylinder 10, or by combinations of these factors, is not precisely known; but it does in fact occur. The degree of vacuum which must be drawn through vacuum means 32, either continuously or intermittently in synchronization with flat objects 14, can best be determined, practicably, in operation of a particular apparatus of the invention with a particular type of flat or sheet-like objects by a brief trial-and-error variation of the vacuum by the operator of the system. In actual practice of the invention it has been found that the degree of vacuum need not be critically precise. In practice it can usually be satisfactorily supplied through vacuum conduit means, such as hoses 38, by conventional rotary vane vacuum apparatus. In a given apparatus, the higher the speed of the rotation of the cylinder 10, the greater the vacuum which must be applied through vacuum means 32. Also, the greater the weight of each flat object 14, the greater the vacuum which must be applied. In practice it has not been found difficult to determine quickly the degree of vacuum necessary to substantially stop the motion of the flat objects 14 in the position and manner hereinabove described. With heavy flat objects 14 in very high-speed operations, a vacuum as great as 25 inches of mercury may be necessary; with very light or almost flimsy objects 14 at relatively low speeds, vacuums as low as 4 to 8 inches of mercury may be sufficient.

Vacuum means 32, as illustrated in FIG. 3, may comprise a hollow plate or prong 46, closed at the end adapted to be mounted adjacent the rotatable cylinder 10 and formed with slots or holes 48 communicating with the interior of the prong 46, through which a vacuum may be drawn. If desired, the vacuum means 32 may be combined with the stripper means 24, as for example by forming metal prongs 26 of stripper means 24 with hollow interiors closed at their operative ends 28, with holes 48 formed therein, and operatively connected with vacuum conduit means such as hoses 38.

In operation of the invention, a sequence of flat objects 14, usually at high speed as described above, are delivered by the system. A first flat object 14A as shown in FIGS. 2 and 4, is held by vacuum means 32 in the manner and position described above, with its major forward or leading portion 34A adjacent stripper means 24 and its minor rear or trailing portion 36A bent away from contact with the surface 20 of the rotating cylinder 10. (In practice, it is often found convenient to "prime" the system of the invention by manually placing a first flat object 14 in this position.) A second flat object 14B, as shown in FIGS. 2 and 4, is received in succession and gripped on the surface 20 of the rotating cylinder 10. The rotation of the cylinder 10 carries the leading edge 16B of the second flat object 14B past the minor rear portion 36A of the first flat object 14A and the operative end 28 of the stripper means 24, thus interposing the second flat object 14B between the surface 20 of the rotating cylinder 10 and the minor rear portion 36A of the first flat object 14A, and commencing to strip the second flat object 14B from the surface 20 of the rotating cylinder 10. The further rotation of the cylinder 10, and the momentum imparted the second flat object 14B, results in the continued stripping of the second flat object 14B from the surface 20 of the rotating cylinder 10 by stripper means 24, and, as the major forward portion 34B of the second flat object 14B moves along adjacent the working surface 30 of stripper means 24, results in the interposing of the major forward portion 34B of the second flat object 14B between the major forward portion 34A of the first flat object 14A and the stripper means 24 and vacuum means 32. The interposition of the second flat object 14B between the first flat object 14A and the vacuum means 32 releases the first object 14A from the application of vacuum. The vacuum instead is applied to the major forward portion 34B of the second flat object 14B and substantially stops the motion of the second flat object 14B in the same manner and position described above. The second flat object 14B is then held forced against the working surface 30 of the stripper means 24 so as to be capable of being released by a third succeeding flat object 14 in the same manner in which the first flat object 14A was released by the second flat object 14B. This system is, in fact, capable of operation as described above with many thousands of succeeding flat objects 14 per hour.

The release of each flat object 14 by a succeeding flat object 14 is relatively gentle, and achieves the release of the flat objects 14 in high-speed operations in substantially motionless condition without any violent impact of the leading edge 16 of the flat object 14 against some obstruction such as conventional delivery rails 40. As each flat object 14 is released in operation of the invention it is in appropriate condition for collection and transfer to another step in a complete processing system, or for removal from the system. In the embodiment illustrated, the collecting or receiving means 40 comprise conventional delivery rails 42 and retainer board 44 mounted adjacent stripper means 24 so as to receive each released flat object 14. The receiving or collecting means 40 may be mounted relatively close to stripper means 24 so that a neat and orderly stacking of released flat objects 14 will be achieved without further operation or structure. Such results are possible in this and other embodiments because in operation of the invention the flat objects 14 are released from adjacent the rotating cylinder 10 so as to be capable of moving slowly and orderly; rather than moving at high speed, usually for a greater distance, to a violent impact, as in conventional systems.

In view of my invention and disclosure variations and modifications to meet individual whim or particular need will doubtless becomes evident to others skilled in the art to obtain part or all of the benefits of my invention, including its inherent safety, inexpensive construction and operation, and durability, without copying what I have shown, and I, therefore, claim all such insofar as they fall within the reasonable spirit and scope of my invention.

I claim:

1. In the process of transferring a succession of flat objects by holding said flat objects on the outer surface of a rotating cylinder so as to impart a forward motion to said objects and rotating said cylinder past stripper means intervening between the forward edges of said objects and the surface of said cylinder so as to remove said objects from the surface of said cylinder, a continuous delivery method which comprises: applying a vacuum to a first said flat object at a point located beyond said stripper means and spaced away from said outer surface of said cylinder as said first object is removed by said stripper means, so as to force the major forward portion of said first object against said stripper means by the force of said vacuum, thereby substantially stopping the forward motion of said first object and bending the minor rear portion of said first object away from contact with the outer surface of said cylinder; holding a second flat object on the outer surface of said cylinder; rotating said cylinder past the minor rear portion of said first object and said stripper means so as to interpose said second object between the outer surface of said cylinder and the minor rear portion of said first object; further rotating said cylinder past said stripper means so as to remove the major forward portion of said second object from the surface of said cylinder and so as to interpose the major forward portion of said second object between the major forward portion of said first object and said stripper means, thereby releasing said first object from said application of vacuum; applying said vacuum to the major forward portion of said second object; and continuing said method with a plurality of succeeding said flat objects.

2. A delivery method as defined in claim 1, including collecting said flat objects after said flat objects are released from said application of vacuum.

3. In an apparatus for transferring a succession of flat objects which includes a rotatable cylinder, means for holding flat objects on the outer surface of said cylinder and means for rotating said cylinder so as to impart a forward motion to objects so held, the combination of: stripper means having one end located closely adjacent the outer surface of said cylinder so as to be capable of intervening between said surface and flat objects held on said surface, thereby being capable of removing the major forward portions of said objects from said surface as said cylinder is rotated, said stripper means extending away from the outer surface of said cylinder at an angle greater than tangency thereto; and vacuum means applying a vacuum to said objects to force said objects against said stripper means, said vacuum means being located adjacent to and spaced from said cylinder so as to be capable of substantially stopping the forward motion of said objects being removed from the outer surface of said cylinder by said stripper means and so as to be capable of holding the major forward portions of said objects so that the minor rear portions of said objects are bent away from the outer surface of said cylinder.

4. A combination as defined in claim 3, including means, located adjacent said stripper means, for collecting flat objects released from said vacuum means.

5. A process for continuously removing flat objects, including: continuously rotating a transfer cylinder past stripper means, continuously applying a vacuum at a location adjacent said stripper means and spaced away from the surface of said cylinder, and continuously passing a succession of flat objects around said cylinder in contact therewith so that each of said objects in turn is lifted from said cylinder by said stripper means, said vacuum applying a lifting force to each of said objects thereby holding each of the objects so lifted against said stripper means and adjacent said transfer cylinder so that a minor portion of said object extends away from said stripper means and from contact with said cylinder, the object following each of the objects so held being moved by said transfer cylinder so as to pass between the minor portion of an object so held and said cylinder onto said stripper mechanism so as to be held by the force of said vacuum, causing the object previously held by said vacuum to be released.

6. A process as defined in claim 5, including continuously collecting said objects after they are released.

References Cited in the file of this patent
UNITED STATES PATENTS

| | | |
|---|---|---|
| 2,752,154 | Nelson | June 26, 1956 |
| 2,905,465 | Armstrong | Sept. 22, 1957 |
| 2,854,236 | Kaddeland | Sept. 30, 1958 |
| 2,936,169 | Nelson et al. | May 10, 1960 |
| 2,954,226 | Azari et al. | Sept. 27, 1960 |